United States Patent [19]

van Lookeren-Campagne et al.

[11] Patent Number: 4,758,417

[45] Date of Patent: Jul. 19, 1988

[54] GAS TREATMENT PROCESS

[75] Inventors: Constant J. van Lookeren-Campagne, Woking; Stephen P. Moore, Maidstone; Edward D. A. Obeng, Cobham, all of England

[73] Assignee: Shell Oil Company, Houston, Tex.

[21] Appl. No.: 922,486

[22] Filed: Oct. 23, 1986

[30] Foreign Application Priority Data

Oct. 30, 1985 [GB] United Kingdom ............... 8526743

[51] Int. Cl.$^4$ ............ C01B 17/16; C01B 17/02; C01B 31/20
[52] U.S. Cl. .................. 423/231; 423/573 R; 423/DIG. 17; 435/168; 435/262; 435/266; 435/822
[58] Field of Search .......... 423/231, 573 R, DIG. 17; 435/262, 266, 168, 822

[56] References Cited

U.S. PATENT DOCUMENTS 3,957,580  5/1976  Nelson .................. 435/180
4,634,672  1/1987  Baumgarten et al. .......... 435/180

FOREIGN PATENT DOCUMENTS 58-152488  9/1983  Japan .
0187192  11/1983  Japan .................. 435/168

OTHER PUBLICATIONS

Perry's Chemical Engineers' Handbook, 1984, Perry et al., pp. 17-27, 17-28.

Primary Examiner—John Doll
Assistant Examiner—Lori S. Freeman

[57] ABSTRACT

The invention provides a process for the removal of hydrogen sulphide from contaminated gas which comprises contacting contaminated gas with an aqueous ferric-ion solution in a first reactor, removing precipitated sulphur from the resulting aqueous iron-containing solution, oxidizing the aqueous iron-containing solution in a second reactor in the presence of an iron-oxidizing microorganism and separating resulting aqueous ferric-ion solution from the microorganism, characterized in that the pH of the aqueous iron-containing solution in the second reactor is maintained in the range 1.2 to 1.9, the total iron concentration in the aqueous solution is at least 15 kg/m$^3$, and the aqueous ferric-ion solution is separated from the microorganism by ultrafiltration.

5 Claims, No Drawings

GAS TREATMENT PROCESS

BACKGROUND OF THE INVENTION

This invention relates to a gas treatment process, and more particularly to a process for the removal of hydrogen sulphide ($H_2S$) from contaminated gas.

Natural gas is frequently contaminated with $H_2S$, particularly where the gas-bearing rock formation contains sulphates and where sulphate-reducing bacteria have entered the formation in water which is used as displacement fluid. $H_2S$ has an objectionable smell, is toxic and produces oxides of sulphur on combustion. These factors lead purchasers not infrequently to refuse to accept gas supplies where $H_2S$ is present at more than 5 ppm (parts per million).

In traditional gas-sweetening processes, $H_2S$ is removed for example by use of solid zinc oxide. Although zinc oxide can be regenerated, such regeneration typically involves heating at temperatures of the order of 500° C., with formation of sulphur dioxide.

Gaseous products of industrial processes may also be contaminated with $H_2S$.

DESCRIPTION OF THE PRIOR ART

Japanese published Patent Application No. 58-152488 proposes a process wherein gas contaminated with $H_2S$ is desulphurised by an aqueous solution containing ferric sulphate, in a desulphuriser. The ferric sulphate is converted to ferrous sulphate and sulphuric acid, and sulphur is precipitated. The ferric sulphate is regenerated by treating the ferrous sulphate with ferrooxidans bacteria, e.g. *Thiobaccilus ferrooxidans,* in an oxidation tank, at pH of 1 to 3, preferably 2 or less. The oxidised solution containing bacteria is led to a sludge separation tank, whence some of the precipitated sludge is returned to the oxidation tank. Supernatant regenerated solution has supplementary water and ferric sulphate added to it and is fed back to the desulphuriser. No specific operating conditions are disclosed, and in particular no data is given in relation to concentrations of components used, e.g. concentration of ferric sulphate. Clearly use of a sludge separation tank will involve employment of relatively very large volumes of solutions.

It has now been found that selection of certain specific conditions enables use of a sludge separation tank to be avoided whilst providing good rates of iron oxidation in a recycle process for removal of hydrogen sulphide from contaminated gas using an aqueous ferric-ion solution.

SUMMARY OF THE INVENTION

According to the present invention there is provided a process for the removal of hydrogen sulphide from contaminated gas which comprises contacting contaminated gas with an aqueous ferric-ion solution in a first reactor, removing precipitated sulphur from the resulting aqueous iron-containing solution, oxidising the aqueous iron-containing solution in a second reactor in the presence of an iron-oxidising microorganism and separating resulting aqueous ferric-ion solution from the microorganism, characterised in that the pH of the aqueous iron-containing solution in the second reactor is maintained in the range 1.2 to 1.9, preferably 1.5 to 1.9, the total iron concentration in the aqueous solution is at least 15 kg/m$^3$, and the aqueous ferric-ion solution is separated from the microorganism by ultrafiltration.

The ultrafiltration may be effected by an ultrafiltration unit which is located either inside or outside of the second reactor. The ultrafiltration membrane may be a conventional commercially available membrane and may, for example, be made of a material selected from polysulfone, ceramics, zirconium, graphite, glassfibre, sintered steel and sintered glass. Suitable polysulfone ultrafilters include for example those available under the trade mark "Diaflo", ex Amicon Corporation, Massachusetts, USA.

The iron-oxiding microorganism may conveniently be *Thiobacillus ferrooxidans* or a microorganism of the genus Sulpholobus or Leptospirillum. Examples of *Thiobacillus ferrooxidans* include ATCC 13598, ATCC 19859 and ATCC 21834.

Those skilled in the art will appreciate that the presence in the aqueous solution of concentrations of anions, such as chloride and nitrate ions, which could lead to inhibition of activity of the iron-oxidising microorganism in the conditions of concentration and pH employed in the process of the invention should be avoided. Thus for example the iron in the aqueous solution may conveniently be present in the form of selenate ($SeO_4^{2-}$). It is preferred that the iron in the aqueous solution is present as sulphate.

The total iron concentration in the aqueous solution is preferably in the range 20 to 30 kg/m$^3$, and may very conveniently be about 25 kg/m$^3$.

Mixing in the second reactor may very conveniently be achieved by means of an internal riser for air-lift action. For enhanced oxygen uptake by the iron-containing solution, the internal riser may be packed with spaced mesh elements. These mesh elements may be of expanded metal, wire gauze, perforated metal or perforated plastics (e.g. polymethylmethacrylate). When the internal riser is cylindrical, the elements will conveniently be discs, and they may conveniently be spaced from one another by annular spacers of inert material, e.g. polymethylmethacrylate.

The invention will be further understood from the following illustrative example.

EXAMPLE 1

The apparatus employed conprised a 4.5 liter air lift reactor having a lower cylindrical portion of internal diameter 80 mm provided with an internal riser for air-lift action having an internal diameter of 50 mm and a length of 345 mm. The internal riser was packed with 28 stainless steel mesh discs of expanded metal (the conformation thereof corresponding to two series of 4 mm parallel filaments at 60° to one another providing a diamond-shaped mesh) separated by 1 cm polymethylmethacrylate cylindrical spacers. Coupled to the reactor in an external loop was a cross-flow ultrafiltration unit containing, as ultrafilter, a "Diaflo" (trademark) H1P 100-20 Hollow Fiber Cartridge, ex Amicon Corporation, Massachusetts, USA, which has a polysulphone ultrafiltration membrane of nominal molecular weight cut-off of 100,000 and surface area 0.06 m$^2$.

The reactor was charged with feed medium to which was added an inoculum of 200 ml of a freshly grown shake-flash culture of *Thiobacillus ferrooxidans* (ATCC 13598) grown on the same medium at 32° C., to a total culture volume in the reactor of 3.7 l.

The composition of the feed medium is as follows:

|   | g/l (kg/m³) |
|---|---|
| $FeSO_4.7H_2O$ | 125 |
| $(NH_4)_2SO_4$ | 0.25 |
| $MgSO_4.7H_2O$ | 0.125 |
| $Ca(NO_3)_2.4H_2O$ | 0.04 |
| $H_3PO_4$ | 0.1 |
| trace elements solution | 2.5 |

The pH of the medium was adjusted to pH 1.8 with concentrated sulphuric acid.

The trace elements solution was an aqueous solution having the following composition:

|   | g/l |
|---|---|
| $CaCl_2.2H_2O$ | 0.66 |
| $ZnSO_4.7H_2O$ | 0.18 |
| $CuSO_4.5H_2O$ | 0.16 |
| $MnSO_4.4H_2O$ | 0.15 |
| $CoCl_2.6H_2O$ | 0.18 |
| $H_3BO_3$ | 0.10 |
| $Na_2MoO_4.2H_2O$ | 0.30 |

The feed medium thus contained 25 g/l iron, as ferrous ions.

During operation of the apparatus, the temperature of the medium was kept at 32° C. and pH was maintained at 1.8, with addition of sulphuric acid as necessary. The feed rate of medium into the reactor was 1 l/h. Air and carbon dioxide were supplied at feed rates of 5 l/minute and 0.25 l/minute, respectively.

Back pressure in the ultrafiltration unit was maintained at 6 psig ($41 \times 10^3$ Pa). Permeability of the ultrafilter was maintained by periodic back-flushing with fresh feed medium.

1 l/hour of permeate was produced by the ultrafiltration unit, containing 25 g/l iron, 90% w as ferric ions (22.5 g/l $Fe^{3+}$).

This permeate was fed from the ultrafiltration unit to a 3 liter stirred tank provided with two six-blade Rushton turbines (Rushton and Oldshue, Chem. Eng. Progress, 49, 161 to 267 (1953)) and maintained at a remperture of 32° C. and atmospheric pressure.

Sour gas (nitrogen containing 9.2% v/v $H_2S$) was passed through the stirred tank at a rate of 49 l/hour, and the outlet gas was found to contain 0.09% v/v $H_2S$.

Residual ferric ion concentration in the liquid effluent from the stirred tank was found to be 2.5 g/l (i.e. 90% w of the 25 g/l iron was present as $Fe^{2+}$ ions). This effluent was circulated back as feed medium to the air lift reactor after removal of precipitated sulphur.

We claim:

1. A process for the removal of hydrogen sulphide from contaminated gas which comprises contacting contaminated gas with an aqueous ferric-ion solution in a first reactor, removing precipitated sulphur from the resulting aqueous iron-containing solution, oxidising the aqueous iron-containing solution in a second reactor in the presence of an iron-oxidising microorganism and separating resulting aqueous ferric-ion solution from the microorganism, characterised in that the pH of the aqueous iron-containing solution in the second reactor is maintained in the range 1.2 to 1.9, the total iron concentration in the aqueous solution is 20–30 kg/m³, and the aqueous ferric-ion solution is separated from the microorganism by ultrafiltration.

2. A process as claimed in claim 1 wherein the pH is maintained in the range 1.5 to 1.9.

3. A process as claimed in claim 2 wherein the iron-oxidising microorganism is *Thiobacillus ferrooxidans* or is a microorganism of the genus Sulpholobus or Leptospirillum.

4. A process as claimed in any one of claims 1 to 3 wherein the iron in the aqueous solution is present as sulphate.

5. A process as claimed in claim 4 wherein the total iron concentration in the aqueous solution is in the range 20 to 30 kg/m³.

* * * * *